(12) United States Patent
Davis et al.

(10) Patent No.: US 8,135,672 B1
(45) Date of Patent: Mar. 13, 2012

(54) DELETING WEBSITE-SPECIFIC DATA AT A WIRELESS-NETWORK GATEWAY

(75) Inventors: John W. Davis, Kansas City, MO (US); Jeff H. Bryan, Olathe, KS (US); Piyush Upadhyay, Overland Park, KS (US); Lyle T. Bertz, Lee's Summit, MO (US); Badri P. Subramanyan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 397 days.

(21) Appl. No.: 12/395,902

(22) Filed: Mar. 2, 2009

(51) Int. Cl.
*G06F 7/00* (2006.01)
*G06F 17/00* (2006.01)
*G06F 15/16* (2006.01)

(52) U.S. Cl. .................. 707/621; 707/619; 707/813
(58) Field of Classification Search .................. 707/621, 707/619, 813
See application file for complete search history.

(56) References Cited

U.S. PATENT DOCUMENTS

| | | | |
|---|---|---|---|
| 6,237,033 B1* | 5/2001 | Doeberl et al. | 709/223 |
| 2004/0039822 A1* | 2/2004 | Bensimon | 709/249 |
| 2004/0215739 A1* | 10/2004 | Atamaniouk | 709/217 |
| 2006/0047829 A1* | 3/2006 | Acharya et al. | 709/229 |
| 2008/0262901 A1* | 10/2008 | Banga et al. | 705/10 |

* cited by examiner

*Primary Examiner* — Greta Robinson
*Assistant Examiner* — Brian E. Weinrich (57) ABSTRACT

Computer-readable media are described to delete a wireless user's website-specific data, or cookies from a wireless-network gateway. A control port is provided at the wireless-network gateway and is configured to receive commands to delete a user's cookies from databases associated with the wireless-network gateway. A command message including a command to delete the user's website-specific data is received from the user's mobile device. The command message includes a unique user identifier to assist in identifying the user's website-specific data. The user's website-specific data are also labeled with the unique user identifier when stored in the databases. The user's website-specific data are identified in the databases using the unique identifier and are deleted. A status indication may be communicated to the mobile device and to the user to indicate successful deletion of the user's cookies.

19 Claims, 5 Drawing Sheets

DELETING WEBSITE-SPECIFIC DATA AT A WIRELESS-NETWORK GATEWAY

SUMMARY

This Summary is provided to introduce a selection of concepts in a simplified form that are further described below in the Detailed Description. This Summary is not intended to identify key features or essential functions of the claimed subject matter, nor is it intended to be used in isolation as an aid in determining the scope of the claimed subject matter. Embodiments of the invention generally relate to methods and computer-readable media at a wireless network gateway for deleting a wireless user's browser cookies. In embodiments of the invention, a command is received by a wireless network gateway from a mobile device, such as a wireless phone to delete cookies stored in databases at the gateway. The cookies are identified in the databases using a unique user identifier and are deleted therefrom. A status message indicating the status of the deletion command is communicated to the mobile device and may be provided to the user.

BRIEF DESCRIPTION OF THE DRAWING

Illustrative embodiments of the invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| PDA | Personal Data Assistant |
| HTTP | Hyper-text Transfer Protocol |
| SMS | Short Message Service |
| MSC | Mobile Switching Center |
| HLR | Home Location Register |
| VLR | Visitor Location Register |
| WAP | Wireless Application Protocol |
| IMSI | International Mobile Subscriber Identity |
| SIM | Subscriber Identity Module |
| MDN | Mobile Directory Number |
| NAI | Network Address Identifier |
| MSID | Mobile Station Identification |

Further, various technical terms are used throughout this description. An illustrative resource that fleshes out various aspects of these terms can be found in Newton's Telecom Dictionary by H. Newton, 24th Edition (2008).

Embodiments of the invention provide computer-readable media to provide a more secure browsing experience when one uses a mobile device to browse the Internet. One action to help in this context is to delete a wireless user's website-specific data, or cookies from a wireless network gateway. A cookie, also known as a browser cookie, a hypertext transfer protocol ("HTTP") cookie, a Web cookie, or a tracking cookie, is website-specific data comprising a segment of text that is transmitted from a server computer to a client device, such as a mobile device and that contains data about a user (hereinafter the terms "cookie" and "website-specific data" are used interchangeably). The website-specific data are sent at any point during or after a user's interaction with a website hosted by the server computer. The data can be about the user's browsing habits, device settings, past purchases, or any other characteristic that a server computer wishes to track. The website-specific data are stored by the client device and are then transmitted to the server computer the next time the user accesses the server computer's website via the client device. By such a process, the server computer can track the user's data without having to independently identify the user and without storing the data internally to the server computer's systems.

Website-specific data can also comprise secure data such as credit card numbers, addresses, account numbers, and private user identification data. Such data are referred to herein as secure website-specific data and are often more securely handled by server computers and client devices in order to protect the user's privacy.

Website-specific data can be provided by the server computer in any available script, code, or protocol. In an embodiment, website-specific data are provided by HTTP protocol. Further, website-specific data are described herein as local or remote. Local website-specific data are stored in memory on a client device, such as a mobile device or personal computer. Remote website-specific data are stored externally to the client device, such as in a database at a wireless-network gateway.

Deletion of website-specific data is desirable for many reasons including decreasing the amount of memory used to store website-specific data, protecting a user's privacy, and removing stale website-specific data that is no longer needed or valid, among other reasons. Mobile devices in the art may allow a user to delete website-specific data from the mobile device's internal memory but do not provide for deletion of website-specific data stored externally to the mobile device. As such, website-specific data containing information about the user are stored without the user having the ability to delete or remove those website-specific data from their storage location. Thus, a user wishing to delete website-specific data in order to protect their information from access by others, or to remove website-specific data that are no longer needed is unable to do so. Further, stale website-specific data that are no longer useful to the user or the website that generated the website-specific data retain memory space at the storage location that might be better utilized for newer website-specific data or other file storage. Therefore, by enabling the deletion of website-specific data stored externally to a user's mobile device, a user is better able to control the security of their information and memory space used for storing website-specific data is more efficiently used.

In one embodiment of the invention, computer-readable media having computer-executable instructions embodied thereon that, when executed, cause a wireless-network gateway to harmonize remote website-specific information stored therein with local website-specific information stored on a mobile device are described. Website-specific data generated by a web-browsing experience of the mobile device are received. A user's web browsing is performed via a mobile device. The website-specific data is stored in a database at the wireless-network gateway. The database is stored within the wireless-network gateway, and the website-specific data is associated with the user. A command is received from the mobile device to delete the website-specific data from the database. The command is generated automatically, manually, or both automatically and manually. The website-specific data is identified in the database at the wireless-network gateway. The website-specific data is deleted from the database.

In another embodiment, computer-readable media having computer-executable instructions embodied thereon that, when executed, cause a wireless-network gateway to harmonize remote website-specific information stored therein with local website-specific information stored on a mobile device are described. Website-specific data items generated by a web browsing experience are received. A user's web browsing is performed via a mobile device. The website-specific data items are stored in databases at a wireless-network gateway. The website-specific data items are associated with the user. A command is received from the mobile device to delete the website-specific data items from the databases. The website-specific data items are identified in the databases. The identified website-specific data items are deleted from the databases. The status of the command is communicated to the mobile device.

In another embodiment, computer-readable media having computer-executable instructions embodied thereon that, when executed, cause a wireless-network gateway to harmonize remote website-specific information stored therein with local website-specific information stored on a mobile device are described. A control port at a wireless-network gateway configured to receive commands to delete website-specific data is provided. The website-specific data are stored in databases accessible by the wireless-network gateway. Each of the website-specific data is labeled with a unique user identifier. The website-specific data are generated through a web browsing experience and the web browsing experience is performed via a mobile device. A command message from the mobile device including a command to delete the website-specific data from the databases is received along with a unique user identifier. The command message is parsed to obtain the unique user identifier. The website-specific data labeled with the unique user identifier in the databases are identified. The identified website-specific data are deleted from the databases. The status of the command is communicated to the mobile device, and the mobile device displays the status to a user.

Figure 1:
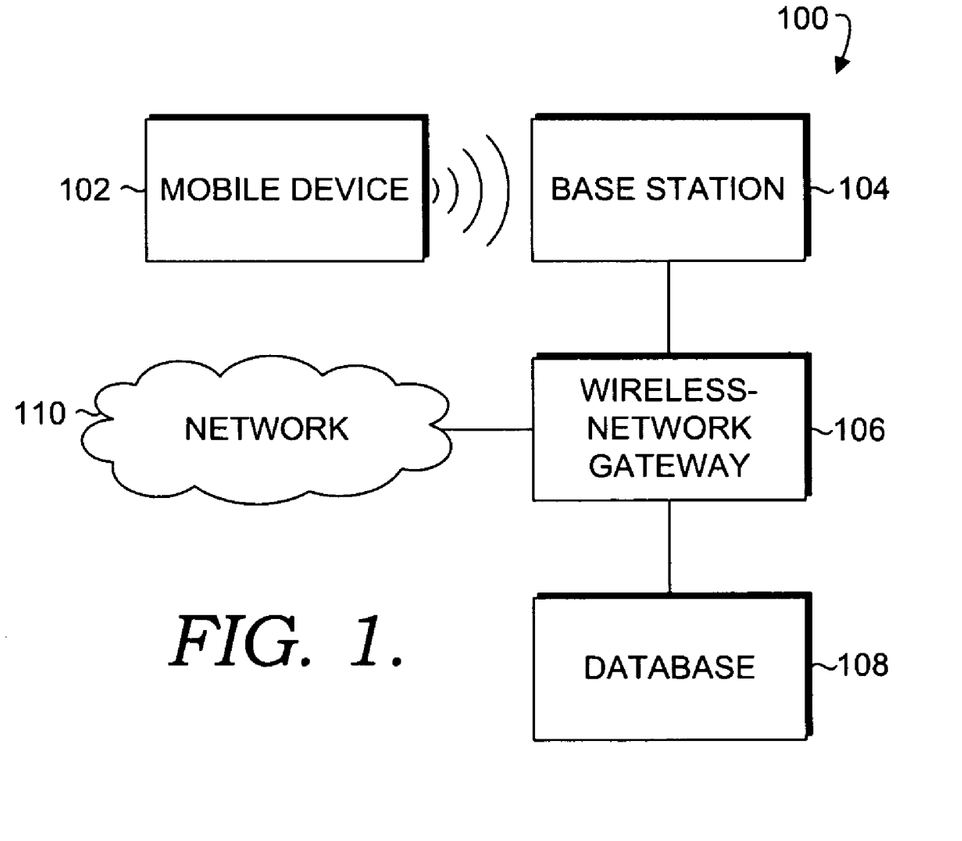
FIG. 1 is a block diagram of an exemplary wireless networking environment suitable for use in implementing embodiments of the invention.

Referring initially to FIG. 1, a block diagram of an exemplary wireless-network environment 100 suitable for use in implementing embodiments of the invention is described. The environment 100 includes a mobile device 102, a base station 104, a gateway 106, and a database 108. The wireless-network environment 100 is any wireless-communications network configured to provide wireless communications with the mobile device 102. Wireless communications include data communication such as that necessary for interaction with the Internet, and in embodiments also includes other communications such as voice communication, short message service ("SMS") messaging, and image or video streaming.

Many additional components and configurations thereof may be used in implementations of the wireless-network environment 100 without departing from the scope of the invention. Those components, such as for example, and not limitation might include switches, routers, access controllers, base station controllers, mobile switching centers ("MSC"), home location registers ("HLR"), and visitor location registers ("VLR"). Such components have been omitted from the block diagram of FIG. 1 for sake of clarity and such is in no manner intended to exclude or include such components from the scope of the invention and the wireless-network environment 100. Additionally, although each of the components in FIG. 1 (102-108) is pictured singularly, in application more than one of each of the components can be utilized. For example, millions of mobile devices 102 are typically in environment 100 as well as hundreds of base stations 104.

The mobile device 102 is any mobile device configured to wirelessly communicate with the base station 104. In an embodiment, the mobile device 102 is a wireless phone, a personal digital assistant ("PDA"), or other device from which a user can wirelessly access a network 110. The network 110 may comprise the Internet, a public network, a private network, or any other network accessible through the wireless network environment 100. In embodiments, the mobile device 102 includes one or more I/O components such as a numeric keypad, an alphanumeric keypad, or a QWERTY keypad, a user interface such as a display monitor, one or more processors, and internal memory, among other components. The mobile device 102 is useable by a user to access, browse, view, and interact with internet content. The internal memory of the mobile device 102 may be employed to store one or more website-specific data that are downloaded to the device from the Internet.

In embodiments, the mobile device 102 has limited internal memory. Thus, only secure website-specific data are stored in the internal memory of the mobile device 102. The remaining website-specific data collected by a user are stored externally to the mobile device 102, such as in a database 108 at a wireless-network gateway 106, as described below.

Additionally, the mobile device 102 provides functionality to allow a user to delete website-specific data. The website-specific data may be deleted from the mobile device's 102 memory, from a database 108 (described below), or both. The mobile device 102 may allow a user to delete all website-specific data or to select specific website-specific data to be deleted.

The base station 104 provides transmission and reception of wireless communication signals from mobile devices 102. The base station 104 may include any components and functions necessary to provide wireless communication with mobile devices 102.

The wireless-network gateway 106 is a network node configured to receive queries from a mobile device 102, parse the queries to the internet, and to return the query results to the device. In an embodiment, the wireless-network gateway 106 also provides translation services, among other functions necessary to parse the queries and to return the results. For example, the wireless-network gateway 106 may comprise a wireless application protocol ("WAP") gateway that formats the query results and other data from the Internet to accommodate characteristics of the mobile device 102, such as small display screen size, low screen resolution, and processing speed of the mobile device 102.

Further, the wireless-network gateway 106 is configured to receive and execute commands from the mobile device 102. In an embodiment, the wireless-network gateway 106 has two ports. A first port is configured to receive Internet queries from the mobile device 102 and a second port is configured to receive commands from the mobile device 102. Commands from the mobile device 102 comprise any available command that the wireless-network gateway 106 is configured to execute. In an embodiment, the gateway 106 is configured to receive and execute a command to delete website-specific data from a database 108. In another embodiment, the wireless-network gateway 106 is also configured to communicate a status indication to the mobile device 102 to indicate the status of a command execution.

The environment 100 may include only a single wireless-network gateway 106 or a plurality of wireless-network gateways. A plurality of wireless-network gateways 106 can be configured in various arrangements. For example, each of the wireless-network gateways 106 can be communicatively linked such that commands executed at a first wireless-network gateway are further executed at each of the remaining wireless-network gateways. Alternatively, each of the wireless-network gateways 106 can operate individually with or without communication between them. Additionally, a plurality of wireless-network gateways 106 can be employed such that each of the wireless-network gateways serves users in a specific geographic area or such that the plurality of wireless-network gateways serves users in all geographic areas generally. Wireless-network gateways 106 can be employed in various arrangements subject to the efficiencies and advantages to the wireless-network environment 100 provided by such arrangements without departing from the scope of the invention.

The database 108 includes any form and structure of computer memory and software useable for storing website-specific data generated when a user accesses the Internet via a mobile device 102. The database 108 is also operable by a wireless-network gateway 106. In embodiments, the database 108 can be internal or external to the wireless-network gateway 106 and can be exclusive to a single wireless-network gateway 106 or can be shared by a plurality of wireless-network gateways 106. For example, a database 108 might be located in the internal memory of a wireless-network gateway 106 and only accessible by the wireless-network gateway 106. Alternatively, a single central database 108 might be located on a server computer system and accessible by one or more remote wireless-network gateways 106 located externally to the server computer. Various configurations of databases 108 and wireless-network gateways 106 are suitable for use in embodiments of the invention and do not depart from the scope thereof.

In an embodiment of the invention, website-specific data are generated by a user's web-browsing experience, or internet activities and are stored in the database 108. The database 108 can receive or intercept the website-specific data directly from a server computer providing a website to the user (with or without the assistance of the wireless-network gateway 106), or the user's mobile device 102 can receive the cookie and then communicate the cookie to the database 108 for storage. The database 108 can store all of a user's website-specific data, a selection of the user's website-specific data, or may only store non-secure website-specific data. In an embodiment, only non-secure website-specific data are stored in the database 108, and the secure website-specific data are stored in a second database in the internal memory of the mobile device 102.

The database 108, wireless-network gateway 106, or the user's mobile device 102 appends a unique user identifier to the cookie to allow identification of the cookie in the database 108. In an embodiment, the unique user identifier might alternatively be supplied by the server computer system generating the website-specific data. The unique user identifier comprises any indicia that allow identification of the cookie as belonging to a specific user and/or mobile device. For example, where a user has more than one mobile device or changes mobile devices the user may have a unique identifier such as an International Mobile Subscriber Identity ("IMSI") stored on a Subscriber Identity Module ("SIM") card that is transferred from one device to another. Thus, the unique identifier on the SIM card identifies the user but is not specific to the mobile device. Alternatively, a unique identifier may identify the mobile device specifically. In an embodiment, the unique user identifier is one of a mobile directory number ("MDN"), a network address identifier ("NAI"), or a mobile station identification ("MSID").

Figure 2:
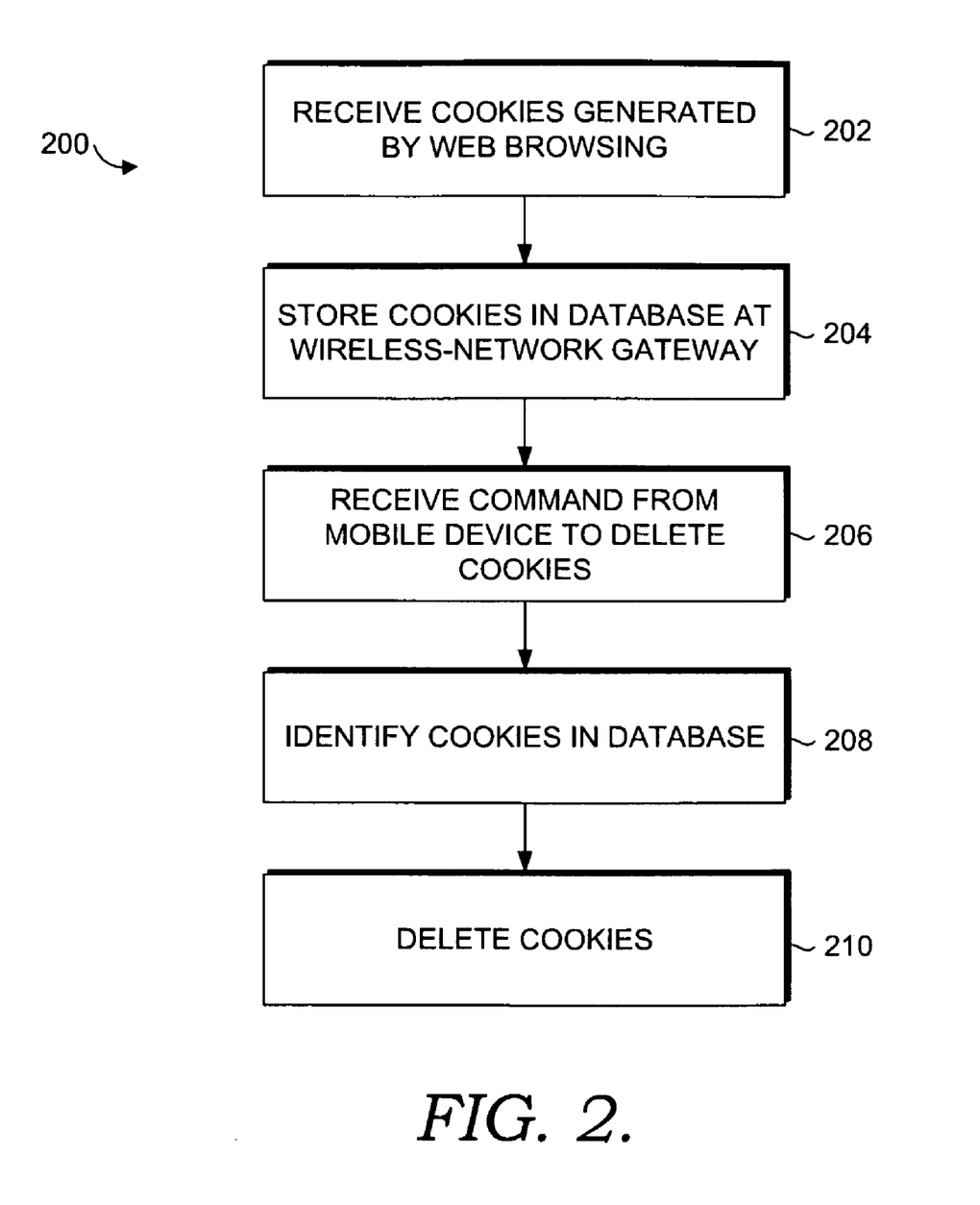
FIG. 2 is a flow diagram depicting a method at a wireless-network gateway to harmonize remote website-specific data stored therein with local website-specific data stored on a mobile device according to an embodiment of the invention.

With reference now to FIG. 2, a flow diagram depicting a method 200 at a wireless-network gateway to harmonize remote website-specific data stored therein with local website-specific data stored on a mobile device is described according to an embodiment of the invention. At 202, one or more website-specific data are generated from a user's web-browsing experience. A web-browsing experience includes any interaction or activities of a user with the Internet or World Wide Web. Such activities might include navigating to webpages or websites, viewing the content therein, downloading content, and making transactions via webpages and websites, among others. The website-specific data are stored in a database, such as the database 104, at a wireless-network gateway, such as the wireless-network gateway 106, at 204. At 206, a command to delete website-specific data is received from a mobile device, such as the mobile device 102, at the wireless-network gateway. The command is generated by the mobile device when the user instructs the mobile device to delete website-specific data. In an embodiment, the command deletes website-specific data stored on the mobile device, and as a background process automatically generates a second command to delete website-specific data and transmits the second command to the wireless-network gateway. In another embodiment, the user manually submits the command to the wireless-network gateway via the mobile device.

In an embodiment, the command is sent in a command message as a hypertext transfer protocol ("HTTP") POST. An HTTP POST is a standard command method in HTTP for submitting data to be processed. The command may be sent in a header or in the body of an HTTP POST. In another embodiment, a unique user identifier is also provided in the HTTP POST message.

The wireless-network gateway is configured to receive commands such as the command to delete web site-specific data. In an embodiment, the gateway has a separate port that is configured to receive commands to delete website-specific data. Commands to delete website-specific data are therefore addressed to the appropriate port and when received by the gateway at that port the commands are identified as such. In another embodiment, the gateway receives commands to delete website-specific data and queries to be parsed to the internet at a single port.

The wireless-network gateway identifies all website-specific data associated with the user of the mobile device in a database, such as the database 108, at 208. Where a unique user identifier is provided with the command, and where the website-specific data have been labeled with a unique user identifier, the website-specific data can be identified by correlating the identifier and labels. In an embodiment, the wireless-network gateway translates the unique user identifier to generate a second unique user identifier with which the website-specific data can be identified. In another embodiment, the gateway employs a separate component of the wireless-network environment, such as wireless-network environment 100 to translate the unique user identifier into a second unique user identifier. For example, where the command provides an MDN to identify the user, the wireless-network gateway, or a separate component might use an algorithm or table to translate the MDN into the user's NAI with which the user's website-specific data have been labeled in the database.

The wireless-network gateway deletes the identified website-specific data from the database at 210. In an embodiment, the website-specific data are deleted from all databases at all wireless-network gateways or are only deleted from a single or selected group of databases. In yet another embodiment, the mobile device also deletes all or a selection of the website-specific data stored in memory on the mobile device. Further, a user may be informed that website-specific data are being deleted from one or both of the mobile device and databases at the wireless-network gateways or the user may only be informed that website-specific data are being deleted generally. The user need not know that website-specific data are stored externally to the mobile device or that the executing a command to delete website-specific data operates both internally and externally to the mobile device. The steps 202-206 may be automatically completed as a background process without the user's direct knowledge.

As described above, there are many available configurations of wireless-network gateways and databases and approaches to storing a user's website-specific data within those databases. As such, there are also many modes by which the deletion of a user's website-specific data from an initial wireless-network gateway can be replicated to other secondary gateways within a wireless-network environment. For example, a user's website-specific data stored in a single database at a single wireless-network gateway are simply identified therein, but where a user's website-specific data are stored in multiple databases at multiple wireless-network gateways there are a variety of processes available for identifying and deleting said website-specific data. A user's website-specific data may be identified in all databases at all wireless-network gateways and deleted at once, or they may be identified and deleted at an initial wireless-network gateway and then commands transmitted to the remaining secondary wireless-network gateways to identify and delete the website-specific data therein. Alternatively, the user's website-specific data can be deleted at an initial wireless-network gateway and then the remaining secondary wireless-network gateways synchronized with the initial wireless-network gateway to complete the deletion process. By yet another example, a user's website-specific data are identified and deleted from a central database that is used by multiple wireless-network gateways. Other techniques for executing the identification and deletion of website-specific data at secondary wireless-network gateways may be available and are suitable for use in practicing the invention without departing from the scope thereof.

Figure 3:
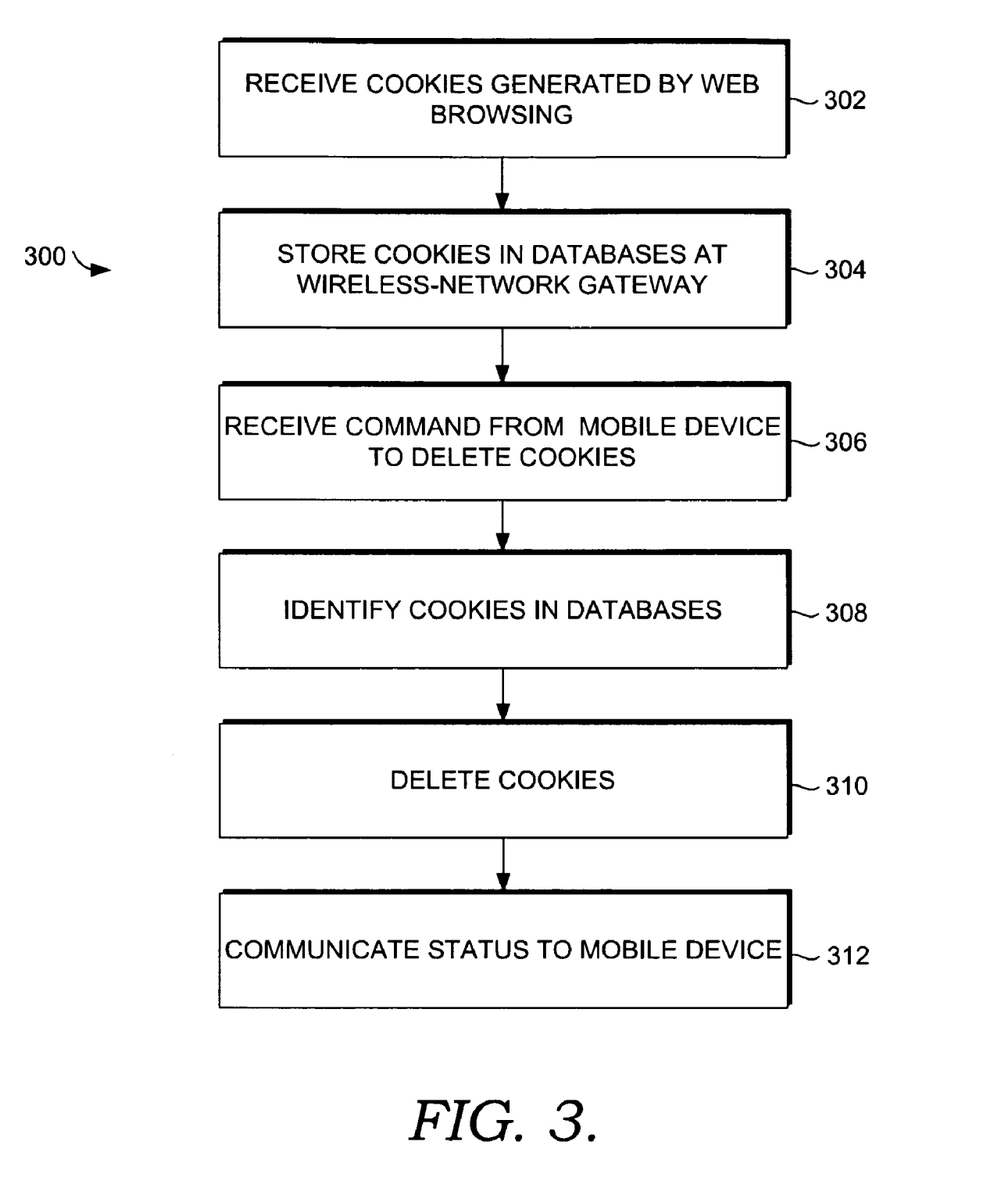
FIG. 3 is a flow diagram depicting a method at a wireless-network gateway to harmonize remote website-specific data stored therein with local website-specific data stored on a mobile device according to an embodiment of the invention.

Referring now to FIG. 3, a flow diagram depicting a method 300 at a wireless-network gateway to harmonize remote website-specific data stored therein with local website-specific data stored on a mobile device is described according to an embodiment of the invention. Website-specific data generated from a user's web-browsing experience are received at one or more databases at a wireless-network gateway, at 302. The website-specific data are stored in the databases, at 304. A command to delete website-specific data is received at a wireless-network gateway, such as the wireless-network gateway 106, from a mobile device, such as the mobile device 102, at 306. The wireless-network gateway identifies website-specific data associated with the user of the mobile device in one or more databases at 308. At 310, the wireless-network gateway deletes the website-specific data from the databases. The wireless-network gateway communicates a status indication to the mobile device at step 312.

The status indication is any signal, indicator, code, or other message transmitted from the wireless-network gateway to the mobile device to inform the mobile device and/or the user of the status of the command execution. In an embodiment, the status indication is a numeric HTTP status code, such as "200" which indicates successful completion of the cookie deletion. The mobile device receives the status indication and may display a status message to the user.

Figure 4:
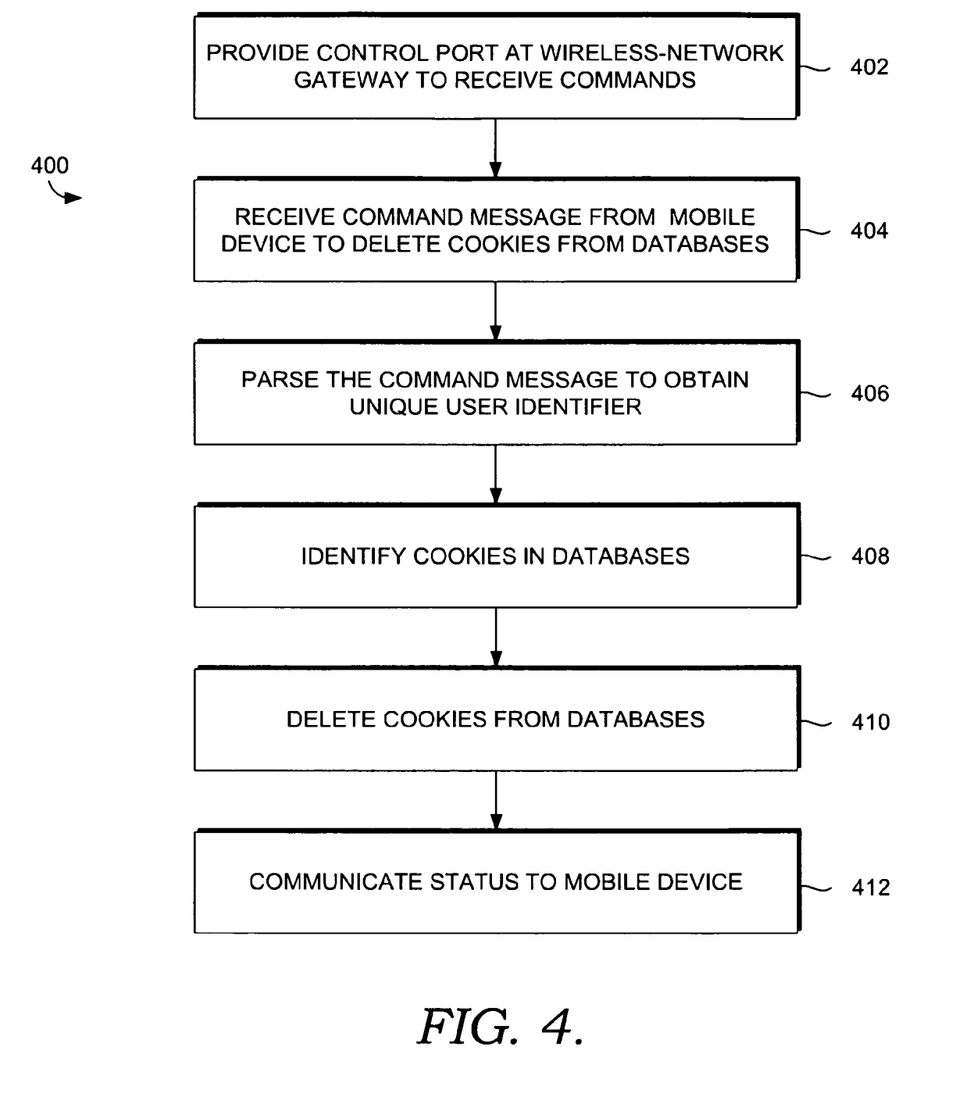
FIG. 4 is a flow diagram depicting a method at a wireless-network gateway to harmonize remote website-specific data or website-specific information stored therein with local website-specific data website-specific information stored on a mobile device according to an embodiment of the invention.

With reference to FIG. 4, a flow diagram depicting a method 400 at a wireless-network gateway to harmonize remote website-specific data or website-specific information stored therein with local website-specific data or website-specific information stored on a mobile device according to an embodiment of the invention is described. A control port configured to receive commands to delete website-specific data is provided at a wireless-network gateway, such as the wireless-network gateway 106, at 402. A command message including a command to delete website-specific data is received by the wireless-network gateway from a mobile device, such as the mobile device 102, at 404. The command message is addressed to the control port and is received by the wireless-network gateway at the control port. The command message is parsed to obtain a unique user identifier, at 406. In an embodiment, the command message is an HTTP POST and the command is contained in the header of the message of along with the user's MDN or NAI. The unique user identifier is used to identify website-specific data in one or more databases, such as the database 108, at 408. In an embodiment, the website-specific data are labeled with the unique user identifier when initially stored in the database. At 410, the identified website-specific data are deleted from the databases, and at 412 the status of the command execution is communicated to the mobile device. In an embodiment, the cookie deletion is completed successfully and the status is communicated to the mobile device as the numeric HTTP status code 200.

Figure 5:
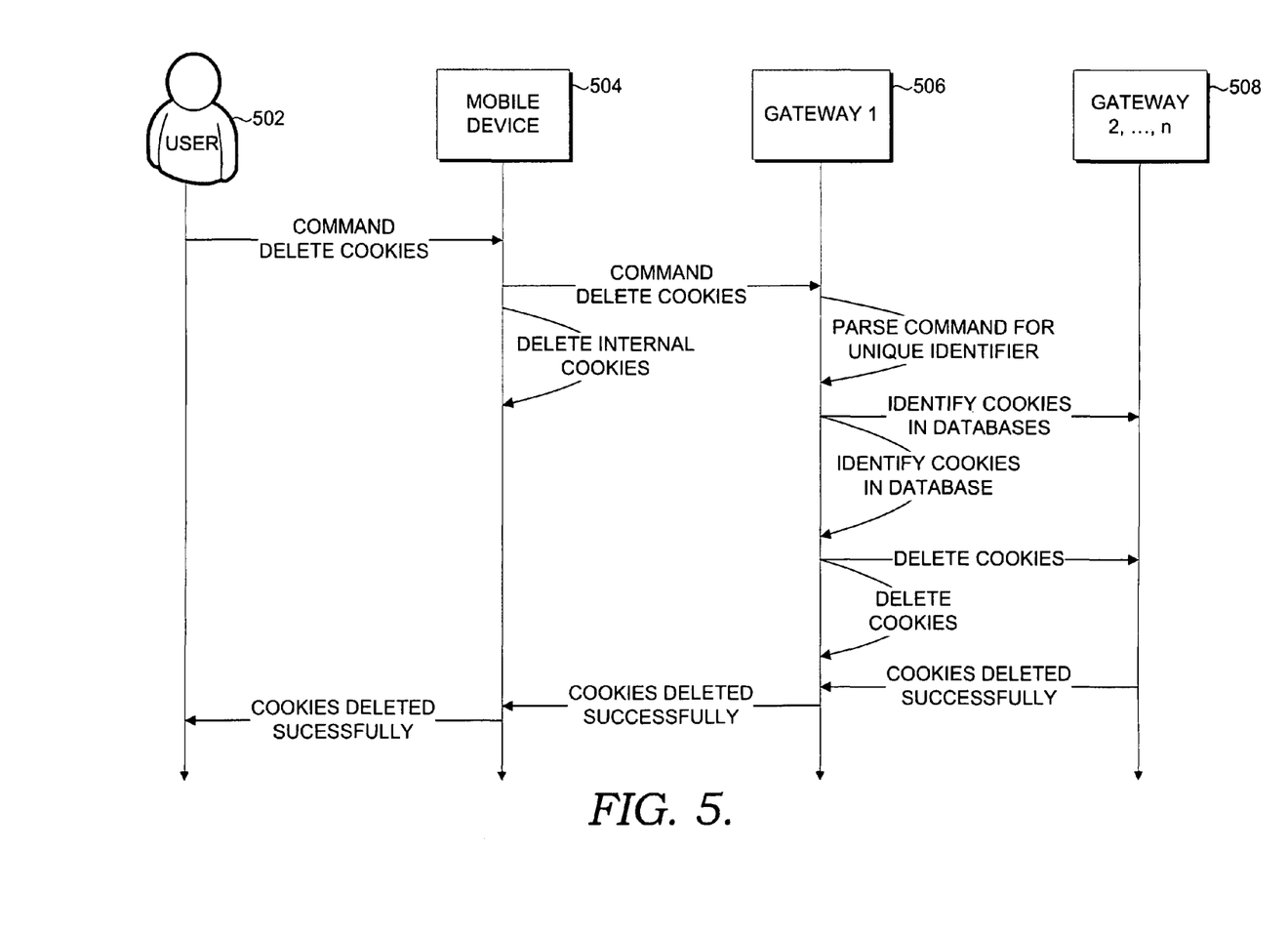
FIG. 5 is a flow diagram illustrating a method at a wireless network gateway to delete a wireless user's cookies according to an exemplary embodiment of the invention.

An illustrative example of an embodiment of the invention is presented below, with reference to FIG. 5 depicting a flow diagram of a method at a wireless network gateway to delete a wireless user's cookies. Initially, a user 502 enters a command to delete cookies on a mobile device 504, such as a wireless phone. As a background process, the mobile device 504 generates a command message. In an embodiment, the command message is an HTTP POST having a command to delete cookies encoded in the header of the message. The POST message also contains the user's mobile device number ("MDN") in the header. The POST message is addressed to a control port of a first gateway 506. In an embodiment, the gateway has one or more internal databases or is in communication with one or more associated databases. The mobile device also deletes all cookies stored internally on the device.

The gateway 506 receives the command message at the control port thereby indicating to the gateway that the message contains a command to be executed rather than a query to be parsed to a network. The gateway 506 parses the command message to obtain the user's MDN. Using the MDN the gateway identifies all cookies located in an internal database. The cookies in the database are labeled with the user's MDN to uniquely identify each cookie with the user. The gateway 506 also communicates with one or more second gateways 508 to identify all of the user's cookies stored in databases associated with each of the one or more second gateways. The gateway 506 deletes the identified cookies from the internal database and communicates a command to each of the second gateways 508 to delete identified cookies in their respective databases. In another embodiment, the command is communicated directly to one or more second databases instead of, or in addition to the one or more second gateways 508.

Each of the second gateways 508 provides a status indicator to the first gateway 506 to indicate successful completion of the cookie deletion command. The first gateway 506 provides a status indicator to the mobile device 504 to indicate successful completion of the cookie deletion command. In an embodiment, the status indicators provided by the second gateways and the first gateway are HTTP 200 status codes. The mobile device 504 provides a notification to the user 502 indicating that the user's cookies were successfully deleted.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. Computer-readable media having computer-executable instructions embodied thereon that, when executed, performs a method that causes a wireless-network gateway to harmonize remote website-specific information stored therein with local website-specific information stored on a mobile device, the method comprising:
  receiving website-specific data generated by a user's web-browsing experience that is performed on a mobile device;
  storing the website-specific data in a database at a wireless-network gateway, the database being associated with the wireless-network gateway, and the website-specific data being associated with the user;
  receiving a command at the wireless-network gateway from the mobile device to delete one or more of the website-specific data from the database, the command being generated automatically as a background process on the mobile device when the mobile device executes a command to delete website-specific data stored on the mobile device, the command comprising a hypertext transfer protocol (HTTP) POST;
  parsing the command to obtain a unique user identifier;
  identifying the website-specific data in the database at the wireless-network gateway;
  deleting the website-specific data from the database; and
  communicating the status of the command to the mobile device as an HTTP status code.

2. The computer-readable media of claim 1, wherein the command is received to delete all of the user's website-specific data.

3. The computer-readable media of claim 1, wherein the command is received to delete a selected group of one or more of the user's website-specific data.

4. The computer-readable media of claim 1, wherein a unique user identifier is received with the command.

5. The computer-readable media of claim 4, wherein the unique user identifier is one of: a mobile device number ("MDN"), a network access identifier ("NAI"), and a mobile station identification ("MSID").

6. The computer-readable media of claim 4, wherein each of the website-specific data are labeled with the unique user identifier and are identified in the database by the unique user identifier.

7. The computer-readable media of claim 1, wherein website-specific data stored in the mobile device are also deleted.

8. The computer-readable media of claim 1, further comprising:
  providing a control port at a gateway configured to receive the command.

9. The computer-readable media of claim 1, wherein the website-specific data comprise one or more cookies.

10. Computer-readable media having computer-executable instructions embodied thereon that, when executed, perform a method that causes a wireless-network gateway to harmonize remote website-specific information stored therein with local website-specific information stored on a mobile device, the method comprising:
  receiving one or more website-specific data items generated by a web-browsing experience, wherein a user's web browsing is performed via a mobile device;
  storing the website-specific data items in one or more databases at a wireless-network gateway, wherein the website-specific data items are associated with the user;
  receiving a command from the mobile device to delete one or more of the website-specific data items from the one or more databases, the command being generated as a background process on the mobile device when the mobile device executes a command to delete website-specific data stored on the mobile device, and the command comprising a hypertext transfer protocol (HTTP) POST;
  parsing the command to obtain a unique user identifier;
  identifying the one or more of the website-specific data items in the one or more databases;
  deleting the identified one or more of the website-specific data items from the one or more databases; and
  communicating the status of the command to the mobile device as an HTTP status code.

11. The computer-readable media of claim 10, wherein the command is in a hypertext transfer protocol ("HTTP") POST.

12. The computer-readable media of claim 11, wherein the command is contained in a header of the HTTP POST.

13. The computer-readable media of claim 11, wherein the HTTP POST also contains at least one of a user's mobile device number ("MDN"), a network access identifier ("NAI"), and a mobile station identification ("MSID").

14. The computer-readable media of claim 10, wherein the status is communicated as a hypertext transfer protocol ("HTTP") status code.

15. The computer-readable media of claim 10, wherein the one or more databases are located at one or more wireless-network gateways, and wherein said wireless-network gateways are communicatively linked.

16. The computer-readable media of claim 10, wherein the one or more website-specific data items are identified and deleted from a central database that is used by one or more wireless-network gateways.

17. The computer-readable media of claim 10, wherein the one or more website-specific data items are identified and deleted from a first database, and wherein one or more second databases are synchronized with the first database to delete said website-specific data items from said second databases.

18. The computer-readable media of claim 10, wherein the wireless-network gateway is a wireless application protocol (WAP) gateway.

19. One or more computer-readable media having computer-executable instructions embodied thereon that, when executed, perform a method that causes a wireless-network gateway to harmonize remote website-specific information stored therein with local website-specific information stored on a mobile device, the method comprising:
  providing a control port at a wireless-network gateway configured to receive commands to delete website-specific data, wherein:
   a) the website-specific data are stored in one or more databases accessible by the wireless-network gateway,
   b) each of the website-specific data are labeled with a unique user identifier,
   c) the website-specific data are generated through a web browsing experience, and
   d) the web browsing experience is performed via a mobile device;
  receiving a command message from the mobile device at the control port including a command to delete one or more of the website-specific data from the one or more databases, wherein the command is generated as a background process on the mobile device when the mobile device executes a command to delete website-specific data stored on the mobile device, and wherein the command comprises a hypertext transfer protocol (HTTP) POST that includes a unique user identifier;
  parsing the command message to obtain the unique user identifier;
  identifying the website-specific data labeled with the unique user identifier in the one or more databases;
  deleting the identified website-specific data from the one or more databases; and
  communicating the status of the command to the mobile device as an HTTP status code, wherein the mobile device displays the status to a user.

* * * * *